United States Patent
Choi et al.

(10) Patent No.: US 9,639,123 B2
(45) Date of Patent: May 2, 2017

(54) WATERPROOF ELECTRONIC DEVICE

(71) Applicant: Samsung Electronics Co., Ltd., Suwon-si, Gyeonggi-do (KR)

(72) Inventors: Jin Hyuk Choi, Yongin-si (KR); Jee Young Jung, Seoul (KR); Seung Soo Han, Seoul (KR); Young Bae Ji, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 14/605,326

(22) Filed: Jan. 26, 2015

(65) Prior Publication Data

US 2015/0253819 A1 Sep. 10, 2015

(30) Foreign Application Priority Data

Mar. 7, 2014 (KR) .................. 10-2014-0027411

(51) Int. Cl.
*G06F 1/16* (2006.01)
*G06F 1/18* (2006.01)

(52) U.S. Cl.
CPC ............ *G06F 1/182* (2013.01); *G06F 1/1656* (2013.01); *G06F 1/1684* (2013.01); *G06F 1/1688* (2013.01)

(58) Field of Classification Search
CPC .................................................... G06F 1/1656
See application file for complete search history.

(56) References Cited

U.S. PATENT DOCUMENTS

| | | | | |
|---|---|---|---|---|
| 6,807,053 B2 * | 10/2004 | An | ......................... | G06F 1/1688 361/679.55 |
| 8,191,706 B1 * | 6/2012 | Liu | ....................... | G06F 1/1628 206/320 |
| 8,243,458 B2 * | 8/2012 | Chen | ....................... | H04M 1/18 361/728 |
| 8,737,052 B2 * | 5/2014 | Cho | ...................... | H04B 1/3883 200/5 A |
| 8,894,242 B2 * | 11/2014 | Tada | ....................... | H04M 1/18 362/267 |
| 9,042,095 B2 * | 5/2015 | Song | ...................... | G06F 1/1626 361/679.21 |
| 2005/0220448 A1* | 10/2005 | Tei | .......................... | G03B 17/08 396/25 |
| 2006/0003652 A1 | 1/2006 | Faucher | | |
| 2008/0163979 A1 | 7/2008 | Faucher | | |

(Continued)

FOREIGN PATENT DOCUMENTS

| | | |
|---|---|---|
| JP | 7-29946 U | 6/1995 |
| JP | 2009-103111 A | 5/2009 |

(Continued)

*Primary Examiner* — Anthony Q Edwards
(74) *Attorney, Agent, or Firm* — Jefferson IP Law, LLP

(57) ABSTRACT

An electronic device is provided. The electronic device includes a housing having a base plate and a sidewall, the sidewall having a shape bent and extended from an end of the base plate, a duct in the base plate that is parallel to a surface of the base plate and having an external end open to the sidewall of the housing, an electronic part placed on an internal surface of the base plate to cover at least a portion of the duct, and a waterproof sheet disposed between the duct and the electronic part to protect the electronic part.

26 Claims, 19 Drawing Sheets

(56) References Cited

U.S. PATENT DOCUMENTS

| | | | | |
|---|---|---|---|---|
| 2011/0157800 A1* | 6/2011 | Richardson | | H04M 1/18 |
| | | | | 361/679.01 |
| 2012/0314354 A1* | 12/2012 | Rayner | | G06F 1/1656 |
| | | | | 361/679.01 |
| 2013/0294020 A1* | 11/2013 | Rayner | | H05K 5/061 |
| | | | | 361/679.01 |
| 2013/0333978 A1 | 12/2013 | Abe et al. | | |
| 2014/0079268 A1* | 3/2014 | Karube | | H04R 1/02 |
| | | | | 381/334 |
| 2015/0237431 A1* | 8/2015 | Jeziorek | | H04R 1/086 |
| | | | | 381/361 |

FOREIGN PATENT DOCUMENTS

| | | |
|---|---|---|
| JP | 2010-283451 A | 12/2010 |
| KR | 10-2011-0090697 A | 8/2011 |
| KR | 10-1354817 B1 | 1/2014 |

\* cited by examiner

WATERPROOF ELECTRONIC DEVICE

CROSS-REFERENCE TO RELATED APPLICATION(S)

This application claims the benefit under 35 U.S.C. §119(a) of a Korean patent application filed on Mar. 7, 2014 in the Korean Intellectual Property Office and assigned Serial number 10-2014-0027411, the entire disclosure of which is hereby incorporated by reference.

TECHNICAL FIELD

The present disclosure relates to a waterproof electronic device.

BACKGROUND

Electronic parts such as a speaker or microphone may be installed in a portable electronic device and a through hole for communicating with these electronic parts is formed in the housing of the electronic device.

Since waterproofing is performed on the through hole of the electronic device and the electronic parts, it is possible to prevent moisture from permeating the through hole.

A waterproof tape is attached to an electronic device in order to prevent moisture from permeating a through hole opening to the outside of a housing and communicating with an electronic part such as a speaker or microphone.

When the electronic part is, for example, the speaker, the electronic device may decrease the size of the through hole to reduce a possibility of moisture permeating in order to support waterproof performance. In this case, since the size of the through hole is small, the acoustic performance of the speaker decreases.

On the contrary, when the size of the through hole increases, the acoustic performance may increase, but since it is easy for moisture to permeate the speaker through the through hole, waterproof performance may decrease.

Also, the front surface (from which sound is emitted) of the speaker faces a side distant from the surface of a housing, in which case it is possible to reflect sound emitted to the front surface of the speaker to laterally spread sound. In this case, a barrier for applying sound to the through hole on the lateral face of the housing is further needed. Since the electronic device needs the barrier as well as the speaker, it is difficult to implement a thin electronic product.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a waterproof electronic device capable of supporting the performance of the electronic part itself as well as waterproof performance.

Another aspect of the present disclosure is to provide a waterproof electronic device having a simple structure to reduce device thickness.

In accordance with an aspect of the present disclosure, an electronic device is provided. The electronic device includes a housing having a base plate and a sidewall, the sidewall having a shape bent and extended from an end of the base plate, a duct in the base plate that is parallel to a surface of the base plate and having an external end open to the sidewall of the housing, an electronic part placed on an internal surface of the base plate to cover at least a portion of the duct, and a waterproof sheet disposed between the duct and the electronic part to protect the electronic part.

In accordance with another aspect of the present disclosure, an electronic device is provided. The electronic device includes a housing having a base plate and a sidewall, the sidewall having a shape bent and extended from an end of the base plate, an electronic part having an input and output element for receiving data on at least one of temperature, humidity and wave from an outside or outputting the data to the outside, wherein the input and output element is disposed to face an internal surface of the base plate, a duct in the housing having a shape recessed toward a surface of the base plate while facing the input and output element, and having an external end open toward a sidewall of the housing, and a waterproof sheet disposed between the electronic part and the duct, covering a surface of the duct facing the input and output element.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
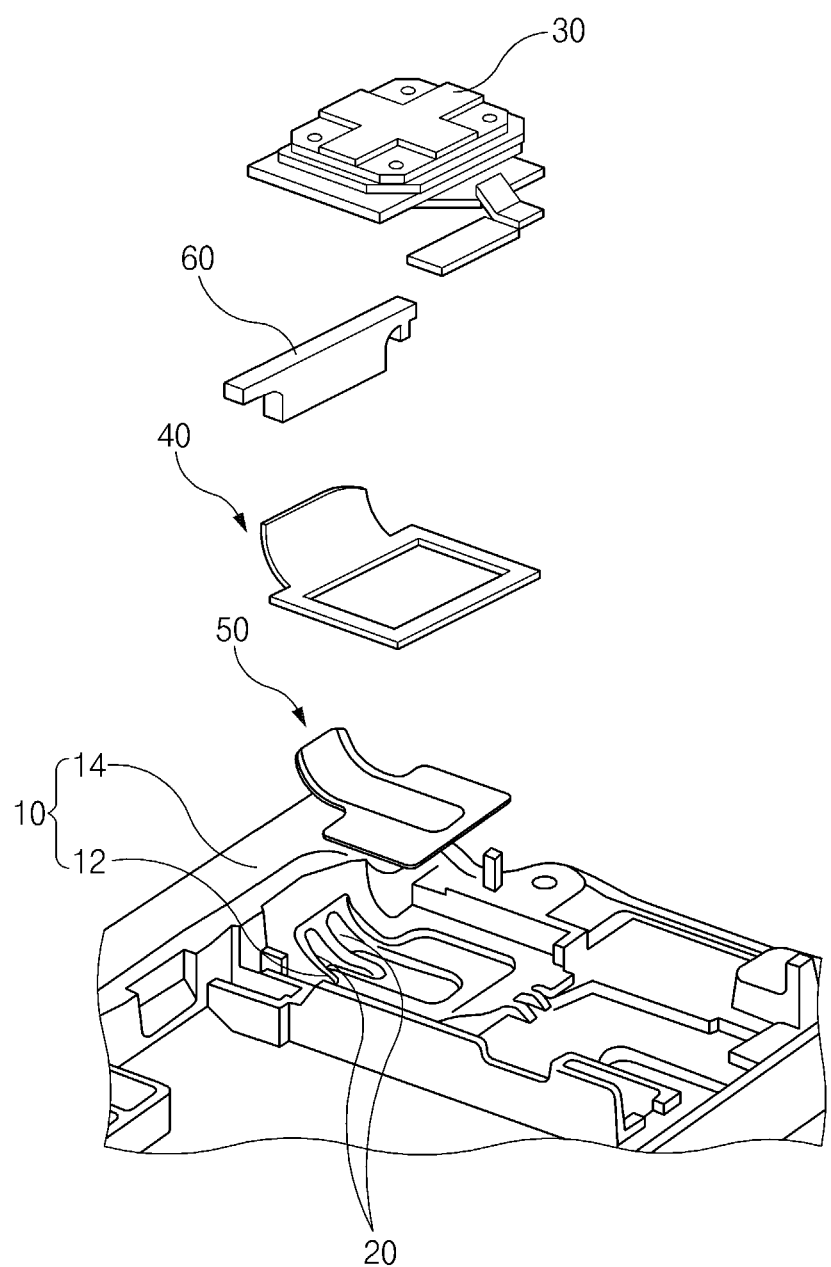
FIG. 1 is an exploded, perspective view of some components of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "include" or "may include" in the present disclosure indicates the presence of a corresponding function, operation or component but does not exclude further one or more functions, operations or components. Furthermore, it should be understood that the term "includes" or "has" indicates the presence of characteristics, numbers, steps, operations, components, parts or combinations thereof represented in the present disclosure but do not exclude the presence or addition of one or more other characteristics, numbers, steps, operations, components, parts or combinations thereof.

The expression "or" in the present disclosure includes any and all combinations of words enumerated together with the expression. For example, the expression "A or B" may include A, B, or both A and B.

The expression "first", "second", "firstly", or "secondly" in the present disclosure may modify various components of the present disclosure but does not limit corresponding components. For example, the expressions above do not limit the order and/or importance of corresponding components. The expressions above may be used to distinguish one component from another. For example, both a first user device and a second user device are user devices that are mutually different user devices. For example, the first component may be named as the second component without departing from the scope of a right of various embodiments of the present disclosure, and similarly, the second component may also be named as the first component.

When it is mentioned that any component is "connected", "accessed" or "coupled" to another component, it should be understood that the former can be directly connected to the latter, or there may be another component in between. On the contrary, when it is mentioned that any component is "directly connected", "directly accessed" or "directly coupled" to another component, it should be understood that there may be no other component in between.

The terms used in the present disclosure are used only to describe specific embodiments and are not intended to limit the present disclosure.

Unless otherwise defined herein, all terms used herein including technical or scientific terms have the same meanings as those generally understood by a person skilled in the art. Generally used terms defined in dictionaries should be construed to have meanings matching with contextual meanings in the related art and are not construed as an ideal or excessively formal meaning unless otherwise defined herein.

An electronic device according to the present disclosure may be a device that includes a communication function. For example, the electronic device may include at least one selected from the group consisting of a smart phone, a tablet personal computer (PC), a mobile phone, a video phone, an e-book reader, a desktop PC, a laptop PC, a net book computer, a personal digital assistant (PDA), a portable multimedia player (PMP), a digital audio player, a mobile medical device, and a camera, a wearable device (e.g., a head-mounted-device (HMD) such as electronic glasses, electronic clothing, an electronic bracelet, an electronic necklace, an electronic accessory, an electronic tattoo, or a smart watch).

According to various embodiments of the present disclosure, the electronic device may be a smart home appliance having a communication function. The smart home appliance may include, for example, at least one selected from the group consisting of a television (TV), a digital video disk (DVD) player, an audio set, a refrigerator, an air conditioner, a cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic frame.

According to various embodiments of the present disclosure, the electronic device may include at least one selected from the group consisting of various medical devices (e.g., a magnetic resonance angiography (MRA) device, a magnetic resonance imaging (MRI) device, a computed tomography (CT) device, a camera, and an ultrasonicator), a navigation system, a global positioning system (GPS) receiver, an event data recorder (EDR), a flight data recorder (FDR), a car infotainment device, electronic equipment for a ship (e.g., a navigation device or gyro compass for a ship), avionics, a security device, a head unit for a vehicle, an industrial or home robot, a financial institution's automated teller machine (ATM) or a store's point of sales (POS) device.

According to various embodiments of the present disclosure, the electronic device may include at least one selected from the group consisting of a portion of a building/structure or furniture including a communication function, an electronic board, an electronic signature receiving device, a projector, and various meters (e.g., water, electricity, gas and electric wave meters). The electronic device according to the present disclosure may be one of the above-described various devices or two or more combinations thereof. Moreover, an electronic device according to the present disclosure may be a flexible device. Also, the electronic device according to the present disclosure is not limited to the above-described devices.

Electronic devices according to various embodiments and an electronic device to which a cover is coupled are described below with reference to the accompanying drawings. The term 'user' used in various embodiments may indicate a person who uses an electronic device, or a device (e.g., an artificial-intelligence electronic device) that uses the electronic device.

Figure 2:
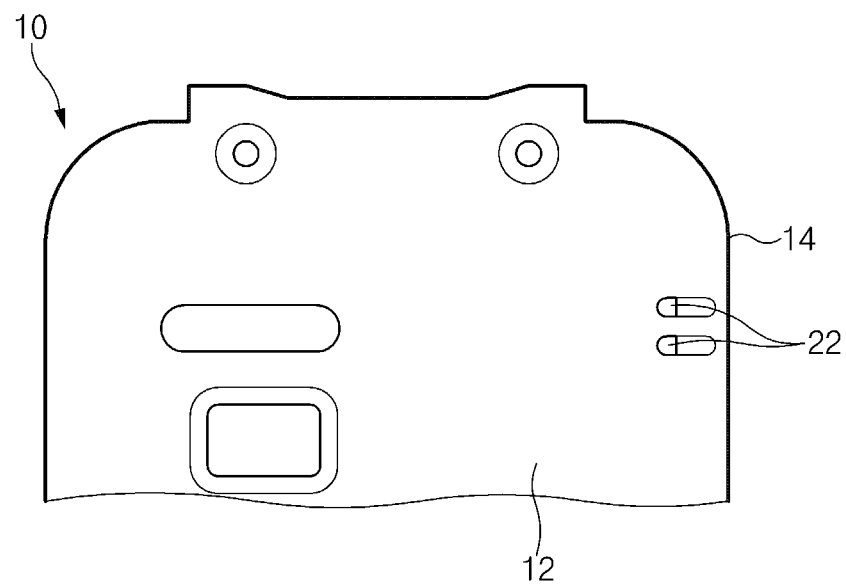
FIG. 2 shows the surface of a housing of an electronic device according to an embodiment of the present disclosure.
Figure 3:
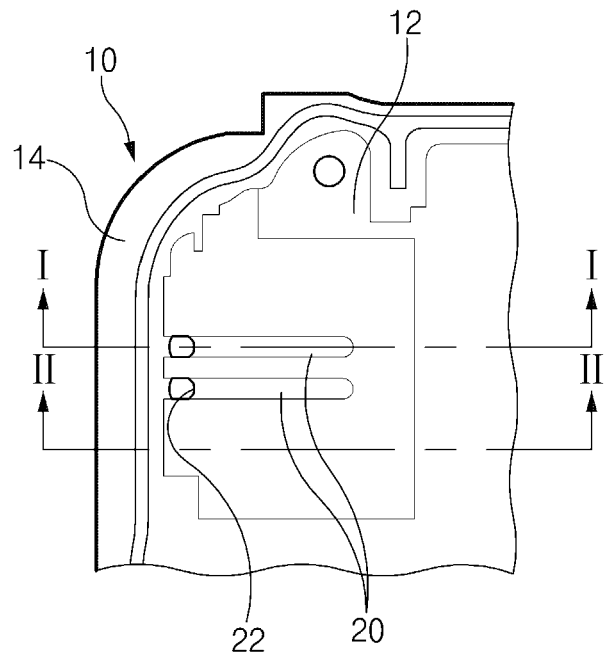
FIG. 3 shows the internal surface of a housing of an electronic device according to an embodiment of the present disclosure.
Figure 4:
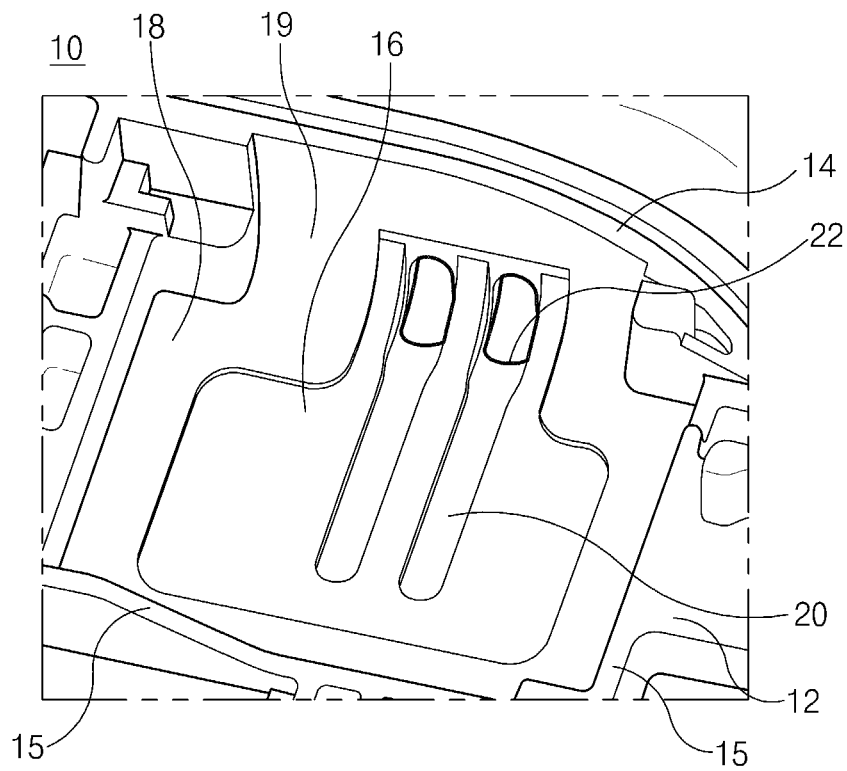
FIG. 4 is a perspective view of the internal surface of the housing in FIG. 3 according to an embodiment of the present disclosure.

FIG. 1 is an exploded, perspective view of some components of an electronic device according to an embodiment of the present disclosure, FIG. 2 shows the surface of a housing of an electronic device according to an embodiment of the present disclosure, FIG. 3 shows the internal surface of a housing of an electronic device according to an embodiment of the present disclosure, and FIG. 4 is a perspective view of the internal surface of the housing in FIG. 3 according to an embodiment of the present disclosure.

Referring to FIGS. 1 to 4, an electronic device according to embodiment of the present disclosure may include a housing 10, a duct 20, an electronic part 30 and a waterproof sheet 40.

The housing 10 may have a base plate 12, and a sidewall 14 bent and extended from the end of the base plate 12.

The duct 20 may be formed in the base plate 12 and disposed parallel to the surface of the base plate 12. The external end 22 of the duct 20 may be open to the sidewall 14 of the housing 10.

The electronic part 30 may be placed on the internal surface of the base plate 12 to cover at least a portion of the duct 20. The waterproof sheet 40 may be disposed between the duct 20 and the electronic part 30 to protect the electronic part 30 from moisture that may be received from the external end 22 of the duct 20.

In this example, the electronic part 30 may be a speaker, a temperature/humidity sensor, and a microphone. Although the speaker is employed as an example of the electronic part 30 in describing various embodiments of the present disclosure, the present disclosure is not limited thereto.

The duct 20 may have a recessed valley-shaped section from the internal surface of the base plate 12.

The electronic device may further include a dustproof sheet 50. The dustproof sheet 50 may be disposed between the duct 20 and the waterproof sheet 40 to protect the electronic part 30 from a foreign material that may be received from the external end 22 of the duct 20.

Figure 5:
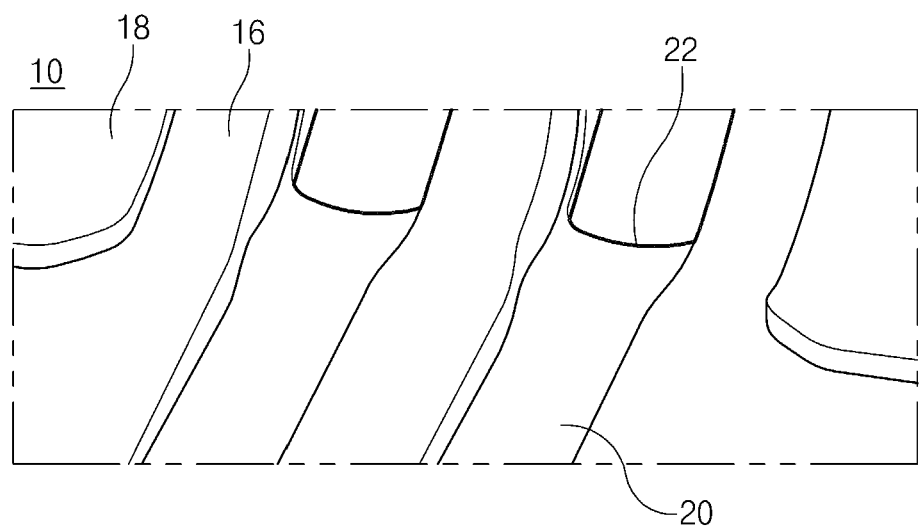
FIG. 5 is an enlarged view of a duct formed on the housing in FIG. 4 according to an embodiment of the present disclosure.

FIG. 5 is an enlarged view of a duct formed on the housing in FIG. 4 and according to an embodiment of the present disclosure.

Figure 6:
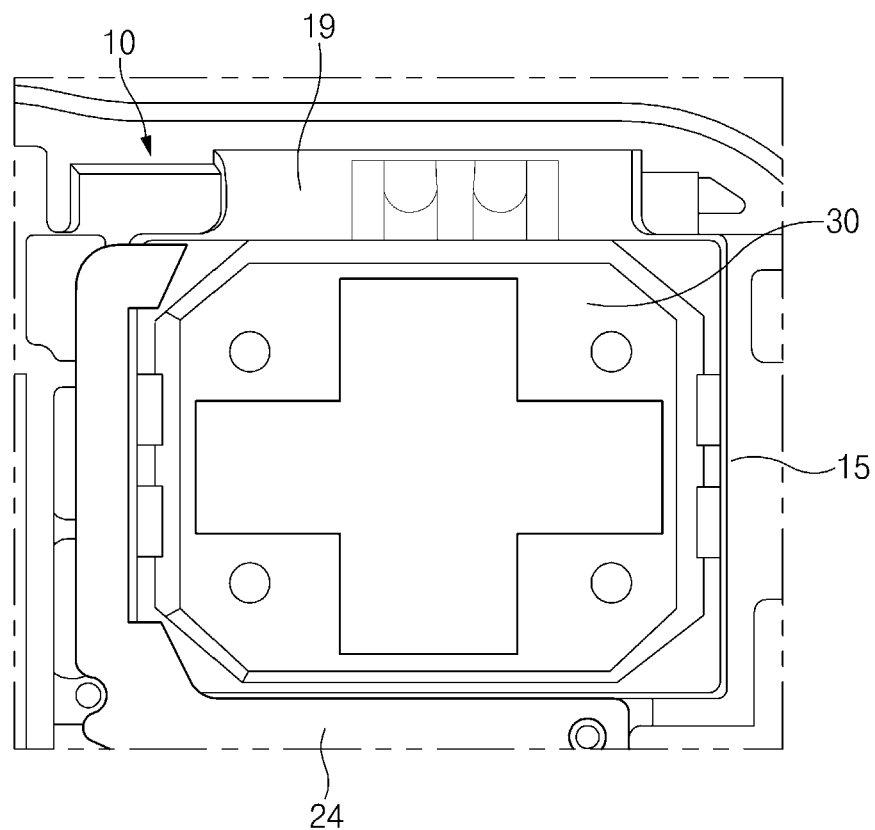
FIG. 6 shows how a speaker is placed in the housing of an electronic device according to an embodiment of the present disclosure.

Referring to FIGS. 4 to 6, a placement guide 15 of an electronic device according to an embodiment of the present disclosure may be disposed near the duct 20 on the internal surface of the housing 10. The placement guide 15 may guide the electronic part 30 to a desired location at which the electronic part 30 is to be placed. The placement guide 15 may have a barrier surrounding the lateral faces of the electronic part 30. Also, the barrier may surround remaining surfaces excluding a portion of the lateral face of the electronic part 30. For example, the barrier near the external end 22 of the duct 20 may be open.

A dustproof sheet holding surface 16 (on which the dustproof sheet 50 is disposed) may be more recessed than a waterproof sheet holding surface 18 (on which the waterproof sheet 40 is disposed). Also, the surface of the duct 20 may be more recessed than the dustproof sheet holding surface 16.

Around the duct 20, at least a section of the connections of the base plate 12 and the sidewall 14 may have a first curved surface 19. The first curved surface 19 may be formed from the waterproof sheet holding surface 18 to the sidewall 14 of the housing 10. In various embodiments, the first curved surface 19 may be a gentle curved surface without an edge. Through the first curved surface 19, the waterproof sheet 40 may be easily attached to the waterproof sheet holding surface 18 or the dustproof sheet 50 may be easily attached to the dustproof sheet holding surface 16. Also, through the first curved surface 19, the sheets 40 and 50 may not be easily peeled after the attaching through the first curved surface 19 and the continuity of attached parts may be guaranteed due to the characteristic of a curved surface. In other words, since there is no gap on an attached surface between the first curved surface 19 and the sheets 40 and 50, it is possible to support high waterproof performance.

Referring to FIG. 6, when the electronic part 30 is a speaker, the speaker may be guided by the placement guide 15 to be placed in the electronic device, facing the internal surface of the base plate 12. The main body of the speaker may be held on a region divided by the placement guide 15 and a flexible printed circuit board (FPCB) 24 drawn from the speaker 30 may be connected to a printed circuit board (PCB) that is installed in an electronic device.

The surface of the duct 20 may be a path for a sound wave emitted from the speaker. The dustproof sheet 50 may cover the duct 20 without being in contact with the surface of the duct 20 so that the sound wave may easily pass through the duct 20. In other words, the dustproof sheet 50 may cover the internal surface of the base plate 12 of the housing 10 and the internal surface of the sidewall 14, in which case the dustproof sheet 50 may not be in touch with the concave surface of the duct 20 having a recessed shape from the internal surface of the base plate 12 and the internal surface of the sidewall 14.

The dustproof sheet 50 may cover the entire section of the duct 20 to prevent dust or metal powder from entering the electronic part 30 through the duct 20 and thus impairing the electronic part 30. Also, the waterproof sheet 40 may cover the entire region of the dustproof sheet 50 to prevent moisture from permeating into the electronic part 30 through the duct 20 and thereby causing a short to the electronic part 30.

Figure 7:
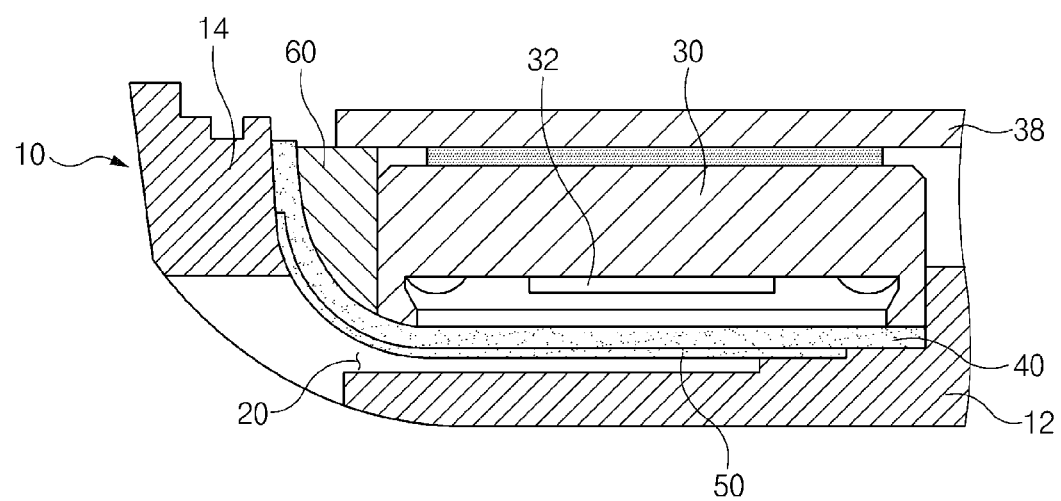
FIG. 7 is a cross-sectional view taken along line I-I in FIG. 3 according to an embodiment of the present disclosure.
Figure 8:
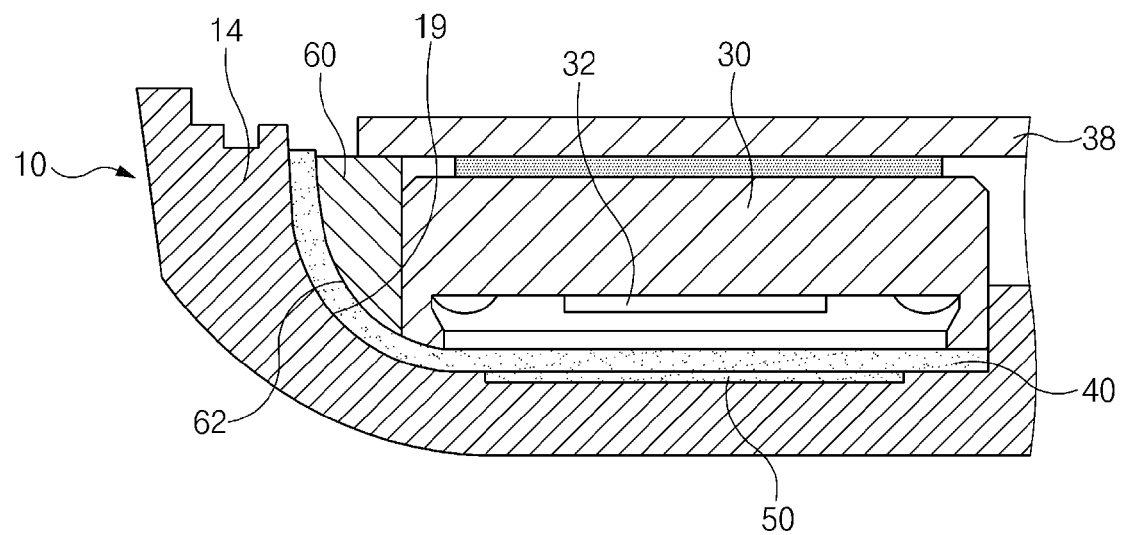
FIG. 8 is a cross-sectional view taken along line II-II in FIG. 3 according to an embodiment of the present disclosure.

FIG. 7 is a cross-sectional view taken along line I-I in FIGS. 3 and 8 is a cross-sectional view taken along line II-II in FIG. 3 according to an embodiment of the present disclosure.

Referring to FIGS. 4, 5, 7, and 8, the cross-sectional area of the external end 22 of the duct 20 may be formed wider than those of remaining sections of the duct 20. When the cross-sectional area of the external end 22 of the duct 20 is widely formed, it is possible to easily discharge moisture to the outside when the moisture permeates into the duct 20, and when the electronic part 30 is a speaker, it is possible to easily emit a sound wave to the outside because an exit through which the sound wave is emitted to the external end 22 of the duct 20 widens.

Typically, the size of an acoustic emission area and the shape of a through hole affect acoustic performance and waterproof performance, and there is a trade-off relationship between the acoustic performance and the waterproof performance. Thus, when the acoustic performance is improved, the waterproof performance may be impaired. Typically, a hydraulic pressure is applied to the exposed region of a waterproof tape of the through hole, and thus the waterproof tape may be easily damaged by the hydraulic pressure.

However, since the waterproof sheet 40 of an electronic device according to various embodiments of the present disclosure covers at least a portion or whole of the acoustic emission area of the speaker 30, the hydraulic pressure may work over all sections of the duct 20 even if water flows into the duct 20. Thus, the hydraulic pressure applied per unit area of the waterproof sheet 40 is lower than that of the related art.

Thus, the electronic device according to various embodiments of the present disclosure may enable a sound wave to be easily emitted to the outside and also reduce a possibility that the waterproof sheet 40 is damaged by the hydraulic pressure or water may flow into the speaker 30 through the edge of the waterproof sheet 40.

The electronic device according to an embodiment of the present disclosure may further include a filler 60. The filler 60 may be disposed in the space between the electronic part 30 and the sidewall 14 of the housing 10 to fill the space.

A surface facing the first curved surface 19 among surfaces of the filler 60 may be formed in a second curved surface 62 having a shape corresponding to the first curved surface 19.

As discussed earlier in FIG. 6, the electronic part 30 may be guided by the placement guide 15 to be placed in the electronic device. An edge portion of a base on which an input and output element 32 is disposed among opposite surfaces of the electronic part 30 may be fixed to the waterproof sheet holding surface 18 and the dustproof sheet holding surface 16 by the pressing of the waterproof sheet 40 and the dustproof sheet 50.

However, when as shown in FIG. 6, the waterproof sheet 40 covers the first curved surface 19 but the electronic part 30 does not cover the first curved surface 19, the filler 60 may be disposed in the space between the electronic part 30 and the sidewall 14 of the housing 10 to cover the first curved surface 19. Also, the filler 60 may also be disposed in the space between the electronic part 30 and another device adjacent thereto or in the space between the barrier of the placement guide 15 and the electronic part 30 as well as in the space between the electronic part 30 and the sidewall 14 of the housing 10.

The second curved surface 62 of the filler 60 may be in surface contact with the waterproof sheet 40 to press the waterproof sheet 40 and the dustproof sheet 50 toward the first curved surface 19. Accordingly, the regions of the waterproof sheet 40 and the dustproof sheet 50 corresponding to the duct 20 may be sufficiently fixed to the internal surface of the housing 10.

The filler 60 may be formed of a hard material or soft material. In the case of the hard material, the filler 60 may have a volume corresponding to a space formed between the electronic part 30 and the sidewall 14 of the housing 10.

On the contrary, when the filler 60 is formed of the soft material, the filler 60 may have a volume larger than the space formed between the electronic part 30 and the sidewall 14 of the housing 10. When the filler 60 is inserted into the space, the filler 60 may be compressed and since the first curved surface 19 and the electronic part 30 are pressed by using the elastic force of the filler 60, the waterproof sheet 40 and the dustproof sheet 50 may be fixed to the first curved surface 19. Also, the electronic part 30 may be stably fixed to the internal surface of the housing 10.

Also, the filler 60 may isolate a surface from the opposite surface on which the input and output element 32 of the electronic part 30 is disposed. When the electronic part 30 is a speaker, the filler 60 may prevent a sound wave emitted from a surface of the speaker 30 on which the input and output element 32 is disposed, from becoming mixed with a sound wave emitted from the opposite surface.

Although the filler 60 presses the first curved surface 19 and the lateral face of the electronic part 30 in various embodiments of the present disclosure, the filler 60 may receive a compressive force from the first curved surface 19 and the lateral face of the electronic part 30, and thus the filler 60 may receive a force moving up in FIG. 7.

The electronic device according to various embodiments of the present disclosure may further include a pressing member 38 for pressing the filler 60 toward the first curved surface 19. The pressing member 38 may fix the locations of the waterproof sheet 40, the dustproof sheet 50, and electronic part 30 in place because the filler 60 stably presses the first curved surface 19 and the lateral face of the electronic part 30.

For example, the pressing member 38 may be disposed on the opposite side of a base facing the base plate 12 among opposite surfaces of the electronic part 30, and the pressing member 38 may be a PCB that is installed in the electronic device.

Figure 9:
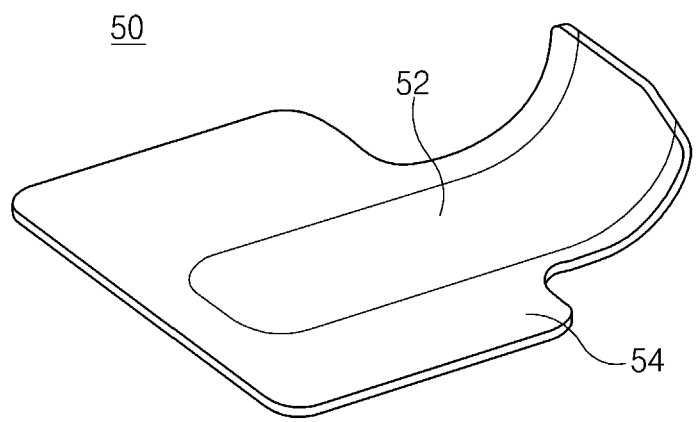
FIG. 9 is a perspective view of a dustproof sheet placed in an electronic device according to an embodiment of the present disclosure.
Figure 10:
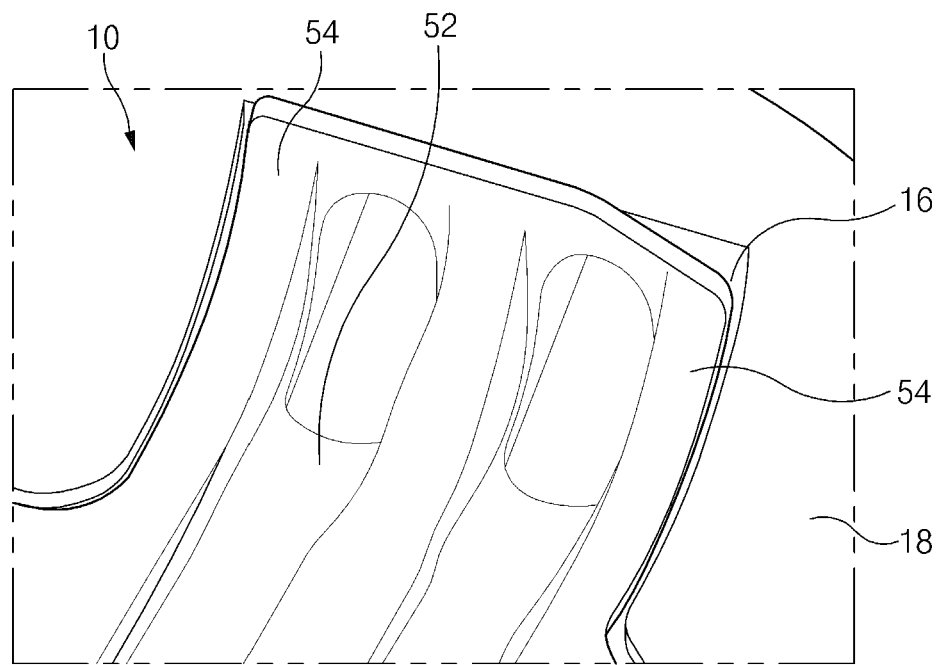
FIG. 10 is a perspective view of the internal surface of the housing of an electronic device according to an embodiment of the present disclosure.

FIG. 9 is a perspective view of a dustproof sheet placed in an electronic device according to an embodiment of the present disclosure and FIG. 10 is a perspective view of the internal surface of the housing of an electronic device according to an embodiment of the present disclosure.

Referring to FIGS. 9 and 10, the dustproof sheet 50 may include an exposed region 52 and an attachment region 54 which may be formed on the perimeter of the exposed region 52.

The dustproof sheet 50 may be formed of woven fabrics or non-woven fabrics. The dustproof sheet 50 may be held in such a manner that the attachment region 54 is attached to the dustproof sheet holding surface 16, as shown in FIG. 10.

The attachment region 54 may be formed by the applying of adhesive to the dustproof sheet 50 or by attaching double-sided tape to the perimeter of the dustproof sheet 50.

Figure 11:
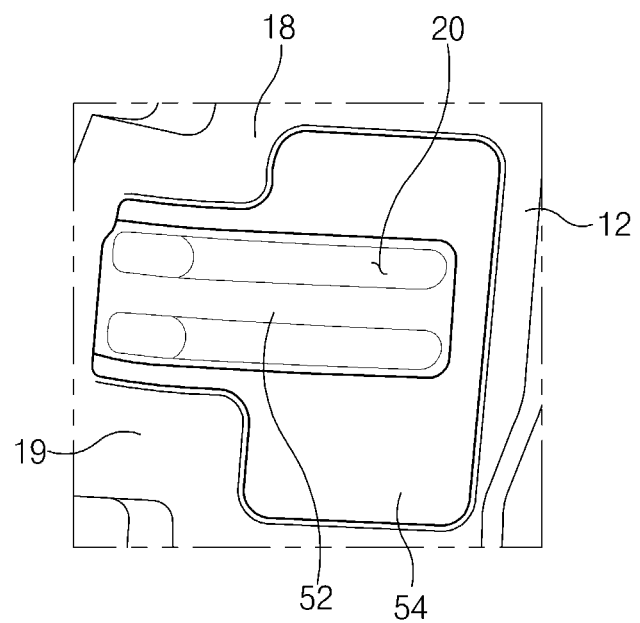
FIG. 11 illustrates a dustproof sheet disposed on a dustproof sheet holding surface according to an embodiment of the present disclosure.

FIG. 11 illustrates a dustproof sheet disposed on a dustproof sheet holding surface according to an embodiment of the present disclosure.

Referring to FIGS. 10 and 11, the dustproof sheet 50 may cover the dustproof sheet holding surface 16 while the attachment region 54 of the dustproof sheet 50 covers regions excluding the perimeter of the duct 20. In this case, the exposed region 52 of the dustproof sheet 50 may correspond to the duct 20.

Also, while the dustproof sheet 50 covers the dustproof sheet holding surface 16, a portion of the attachment region 54 of the dustproof sheet 50 facing the waterproof sheet 40 may have substantially the same height as the surface of the waterproof sheet holding surface 18. In this case, the phrase "substantially the same height" may mean a height capable of maintaining a state in which an attachment region 44 of the waterproof sheet 40 is completely attached to the surface of the dustproof sheet 50 as well as to the waterproof sheet holding surface 18 even without an external force, when the attachment region 44 of the waterproof sheet 40 is attached to the waterproof sheet holding surface 18.

Figure 12:
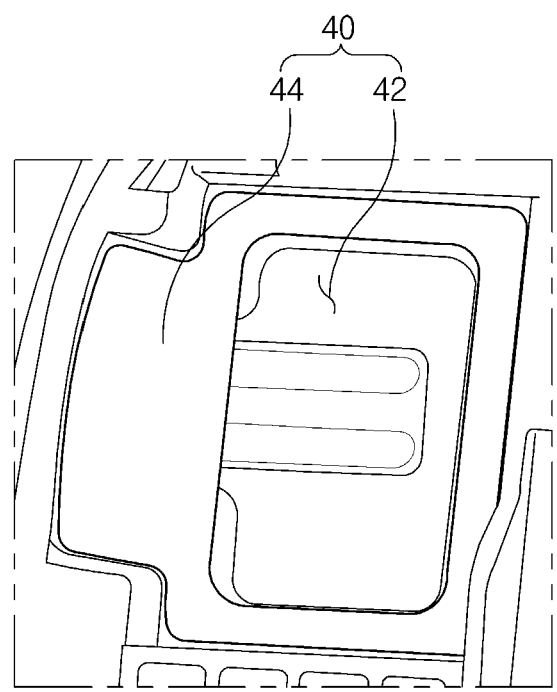
FIG. 12 illustrates a waterproof sheet disposed on a waterproof sheet holding surface, covering a dustproof sheet according to an embodiment of the present disclosure.
Figure 13:
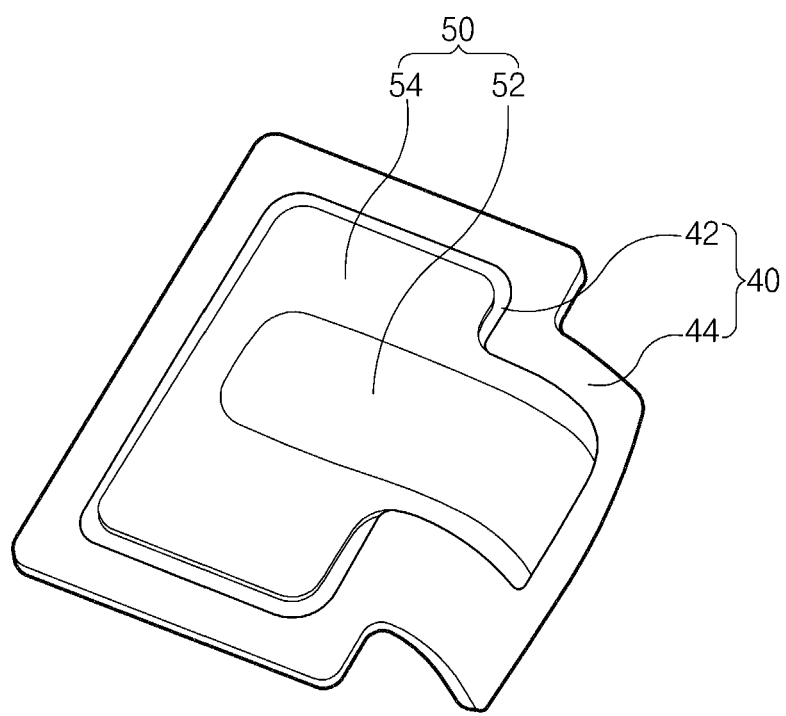
FIG. 13 is a perspective view of the dustproof sheet and the waterproof sheet in FIG. 12 when the sheets are exploded and viewed from the opposite side according to an embodiment of the present disclosure.

FIG. 12 illustrates a waterproof sheet disposed on a waterproof sheet holding surface, covering a dustproof sheet according to an embodiment of the present disclosure, and FIG. 13 is a perspective view of the dustproof sheet and the waterproof sheet in FIG. 12 when the sheets are exploded and viewed from the opposite side according to an embodiment of the present disclosure.

The dustproof sheet 50 is attached to the dustproof sheet holding surface 16 as shown in FIG. 11, and then it is possible to cover the dustproof sheet 50 with the waterproof sheet 40 as shown in FIG. 12.

Referring to FIGS. 12 and 13, the waterproof sheet 40 may include an exposed region 42 and an attachment region 44. The attachment region 44 may be formed on the perimeter of the exposed region 42.

Also, while the attachment region 44 covers at least a portion of the dustproof sheet 50 and the waterproof sheet holding surface 18, the waterproof sheet 40 may be disposed on the waterproof sheet holding surface 18 and also cover the first curved surface 19, as shown in FIG. 12.

The dustproof sheet holding surface 16 and the waterproof sheet holding surface 18 may have narrow areas and the dustproof sheet 50 and the waterproof sheet 40 may also be attached to the first curved surface 19 in addition to the dustproof sheet holding surface 16 and the waterproof sheet holding surface 18. A separate jig may be used for the attaching of the dustproof sheet 50 and the waterproof sheet 40.

When there is a shape in which the attachment region 44 of the waterproof sheet 40 surrounds the perimeter of the attachment region 54 of the dustproof sheet 50 as shown in FIG. 13, it is possible to safely protect the electronic part 30 from moisture if the moisture permeates into the attachment region 54 through the duct 20 because the attachment region 44 re-blocks the moisture.

In order to efficiently prevent moisture from permeating the electronic part 30 through the attachment region 44 of the waterproof sheet 40, the attachment region 44 of the waterproof sheet 40 may be formed to have a width of about 1 mm.

The attachment region 44 of the waterproof sheet 40 may be formed on opposite surfaces of the waterproof sheet 40. In this case, the attachment region 44 of the waterproof sheet 40 may play a role in preventing moisture from permeating into the electronic device through the duct 20 and the dustproof sheet 50 and also fix the locations of the electronic part 30 and the filler 60.

Figure 14:
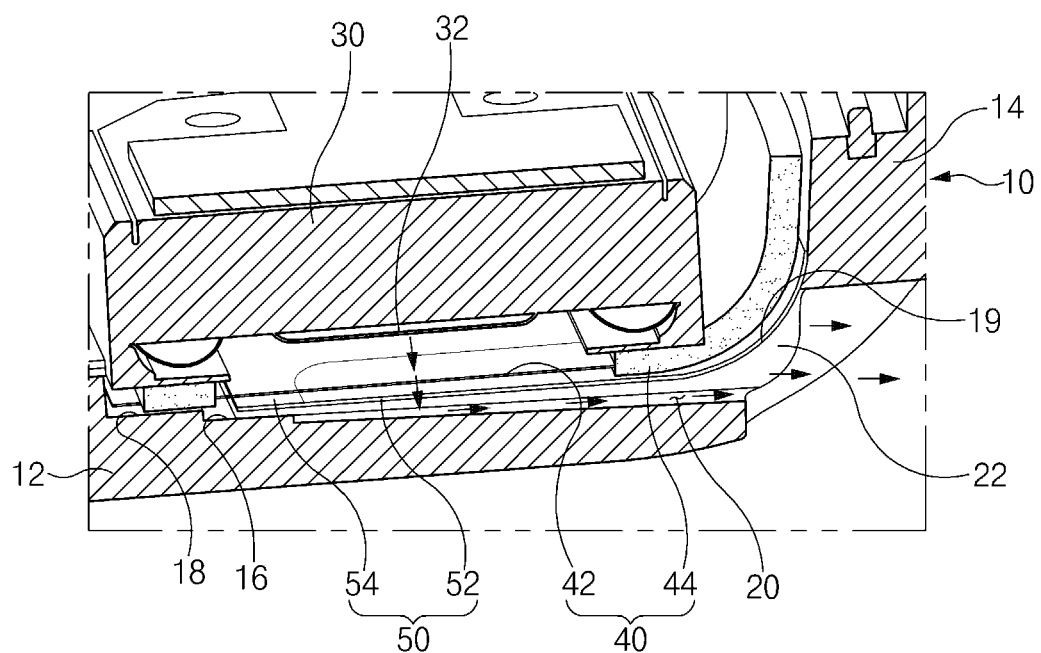
FIG. 14 is a longitudinal, sectional view of an electronic device according to an embodiment of the present disclosure, which is obtained by cutting the electronic device along the length direction of a duct.
Figure 15:
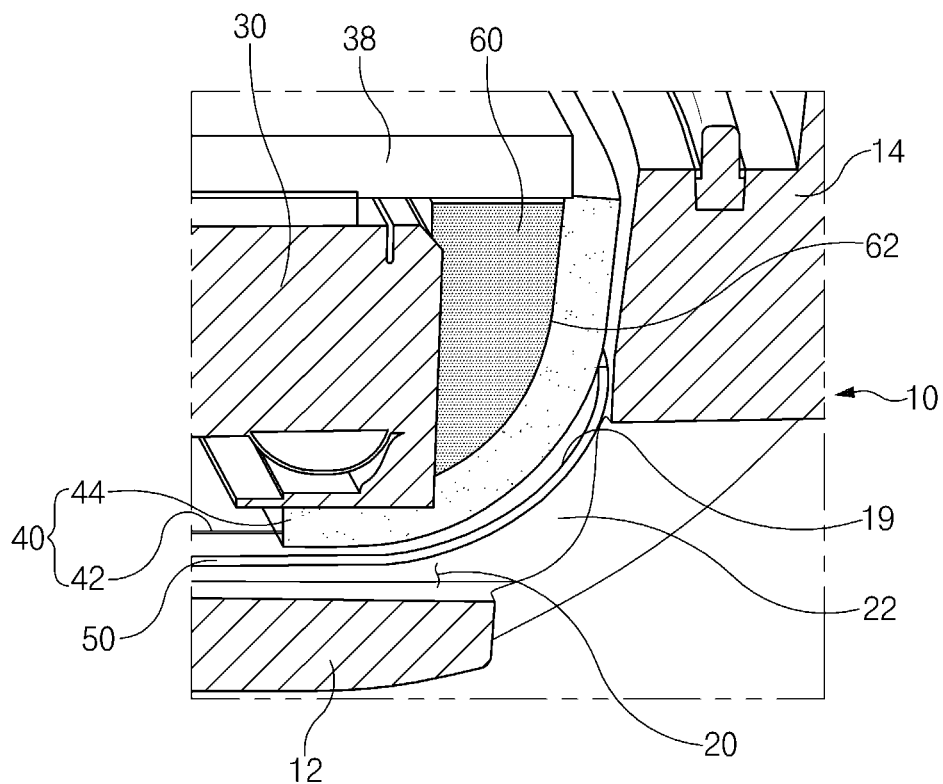
FIG. 15 is a longitudinal, sectional view of an electronic device illustrating a filler disposed in the electronic device in FIG. 14 according to an embodiment of the present disclosure.

FIG. 14 is a longitudinal, sectional view of an electronic device according to an embodiment of the present disclosure, which is obtained by cutting the electronic device along the length direction of a duct, and FIG. 15 is a longitudinal, sectional view of an electronic device illustrating a filter disposed in the electronic device in FIG. 14 according to an embodiment of the present disclosure.

Referring to FIGS. 14 and 15, there may be a space between the central portion of the lateral face of the base plate of the electronic part 30 and the waterproof sheet 40. Also, there may be a space between the input and output element 32 of the electronic part 30 and the exposed region 42 of the waterproof sheet 40.

Also, there may also be a space between the exposed region 42 of the waterproof sheet 40 and the exposed region 52 of the dustproof sheet 50.

When there is the space between the input and output element 32 and the duct 20, the duct 20 may not completely adhere to the surface of the input and output element 32 and accordingly, a sound wave generated from the input and output element 32 may be first emitted into the space. The sound wave emitted to the space may be discharged to the outside through the duct 20.

That is, an electronic device according to an embodiment of the present disclosure may emit the sound wave through a wider area of the input and output element 32 in comparison to when there is no space between the input and output element 32 and the duct 20, and accordingly, the performance of the input and output element 32 may be completely provided.

Referring to FIG. 14, an electronic device according to an embodiment of the present disclosure may include a housing 10, the electronic part 30, the duct 20, and the waterproof sheet 40. The housing 10 may have the base plate 12, and the sidewall 14 bent and extended from the end of the base plate 12. The electronic part 30 may have the input and output element 32 that receives at least one of a temperature, humidity and wave from the outside or output a wave to the outside, and the input and output element 32 may be disposed to face the internal surface of the base plate 12.

Also, the duct 20 may be formed in the housing 10 to have a shape recessed toward the surface of the base plate 12, facing the input and output element 32. The external end 22 of the duct 20 may be open to the sidewall 14 of the housing 10. The waterproof sheet 40 may be disposed between the electronic part 30 and the duct 20, covering a surface of the duct 20 facing the input and output element 32.

There may be the dustproof sheet 50 between the duct 20 and the waterproof sheet 40 in order to protect the electronic part 30 from a foreign material entering from the external end 22 of the duct 20.

When a speaker is employed as the electronic part 30, arrows appearing from the input and output element 32 to the external end 22 of the duct 20 may represent sound waves emitted from the speaker 30.

That is, a sound wave output from the input and output element 32 enters the duct 20 through the waterproof sheet 40 and the dustproof sheet 50 and is then bent in the direction parallel to the surface of the base plate 12 to be output to the outside through the external end 22 of the duct 20.

When the input and output element 32 is a microphone or a temperature/humidity sensor, data input to the input and output element 32 may be input in the opposite direction to the arrow shown in FIG. 14. More specifically, data input to the input and output element 32 may enter the duct 20 through the external end 22 and is bent away from the surface of the base plate 12 to be input to the input and output element 32 through the dustproof sheet 50 and the waterproof sheet 40.

That is, data input to the duct 20 through the external end of the duct 20 may be input toward the input and output element 32 from a recessed face forming the duct 20.

According to various embodiments of the present disclosure, since the input and output element 32 of the speaker 30 faces the duct 20 formed on the internal surface of the housing 10, there is no need for a separate barrier for guiding sound to the through hole on the housing unlike the related art and thus it is possible to implement a thin electronic device.

Figure 16:
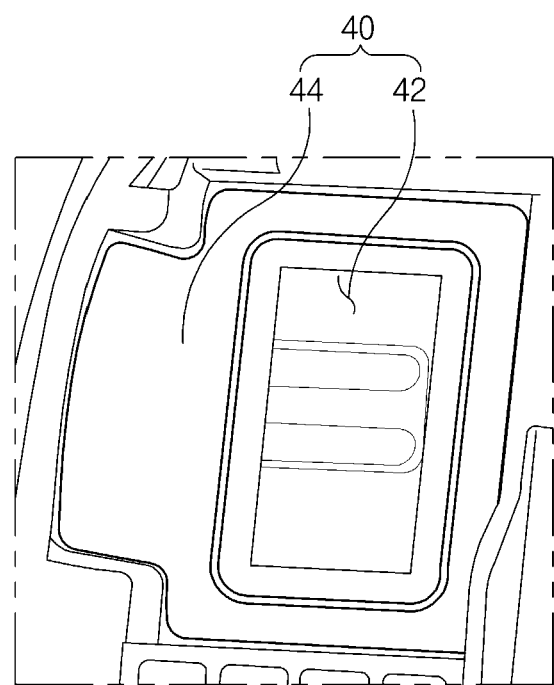
FIG. 16 illustrates a waterproof sheet disposed on a waterproof sheet holding surface according to an embodiment of the present disclosure.
Figure 17:
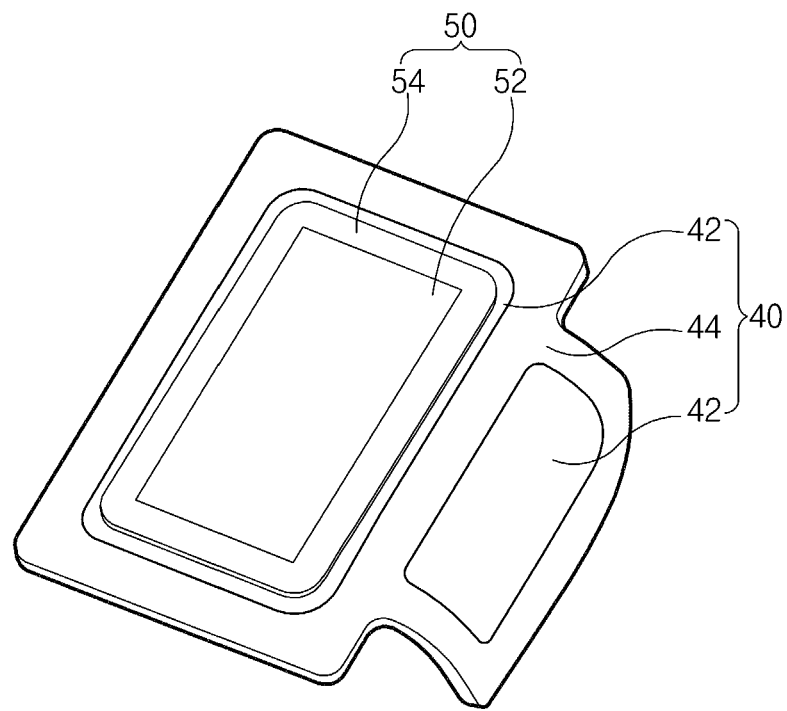
FIG. 17 is a perspective view of the dustproof sheet and the waterproof sheet in FIG. 16 when the sheets are exploded and viewed from the opposite side according to an embodiment of the present disclosure.

FIG. 16 illustrates a waterproof sheet disposed on a waterproof sheet holding surface in an electronic device according to an embodiment of the present disclosure, and FIG. 17 is a perspective view of the dustproof sheet and the waterproof sheet in FIG. 16 when the sheets are exploded and viewed from the opposite side according to an embodiment of the present disclosure.

Referring to FIGS. 12, 13, 16, and 17, the embodiment shown in FIG. 12 has a significantly similar shape to an embodiment shown in FIG. 16 but both embodiments have a different exposed region 52 and attachment region 54 formed on the dustproof sheet 50 and a different exposed region 42 and the attachment region 44 formed on the waterproof sheet 40.

As such, the shapes of the exposed regions 42 and 52 and the attachment regions 44 and 54 forming the dustproof sheet 50 and the waterproof sheet 40 may vary. For example, by increasing the thickness of the attachment regions 44 and 54 located near a portion which moisture may permeate through the duct 20, it is possible to reduce a probability that moisture permeates the electronic part 30.

Figure 18:
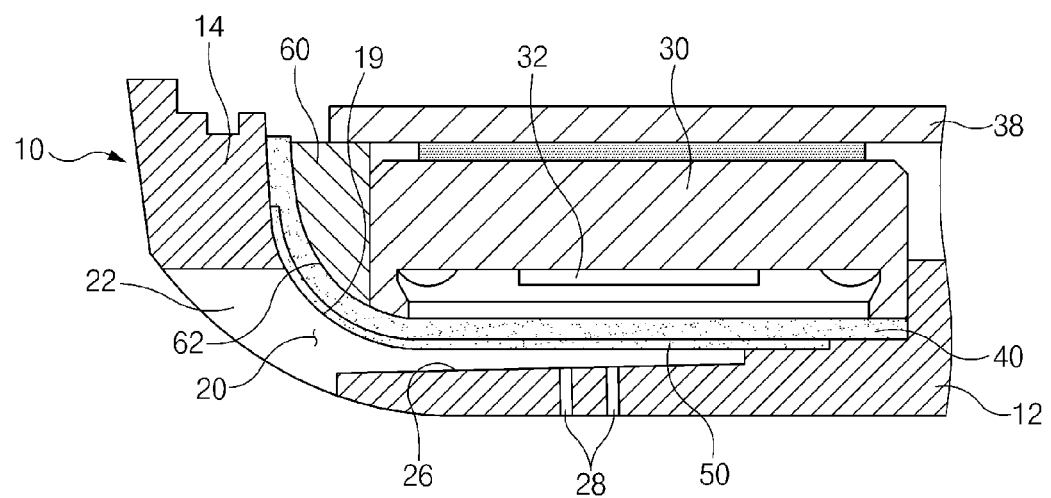
FIG. 18 is a cross-section view taken along line I-I of FIG. 3 of an electronic device according to an embodiment of the present disclosure.

FIG. 18 is a cross-section view taken along line I-I of FIG. 3 of an electronic device according to various embodiments of the present disclosure.

Referring to FIG. 18, the duct 20 may have a slope decreasing toward the external end 22 of the duct 20. The housing 10 may have a communication hole 28 that is branched from the duct 20 and communicated with the surface of the base plate 12.

If the duct 20 has the slope, water drop may be discharged to the outside of the duct 20 along the slope when the electronic device is placed on the ground. Also, when the communication hole 28 is branched from the duct 20, water drop may be discharged from the duct 20 even if the water drop blocks the central portion of the duct 20 because the internal end of the duct 20 may be communicated with the outside.

Although FIG. 18 shows that the external face of the base plate 12 is a member having a clean, continuous face, it is also possible to form the base plate 12 by connecting a plurality of members. In this case, by disposing the communication hole 28 in a parting line at which the plurality of members are connected, a design may be implemented so that the communication hole 28 does not stick out when the housing 10 is viewed from the outside.

Figure 19:
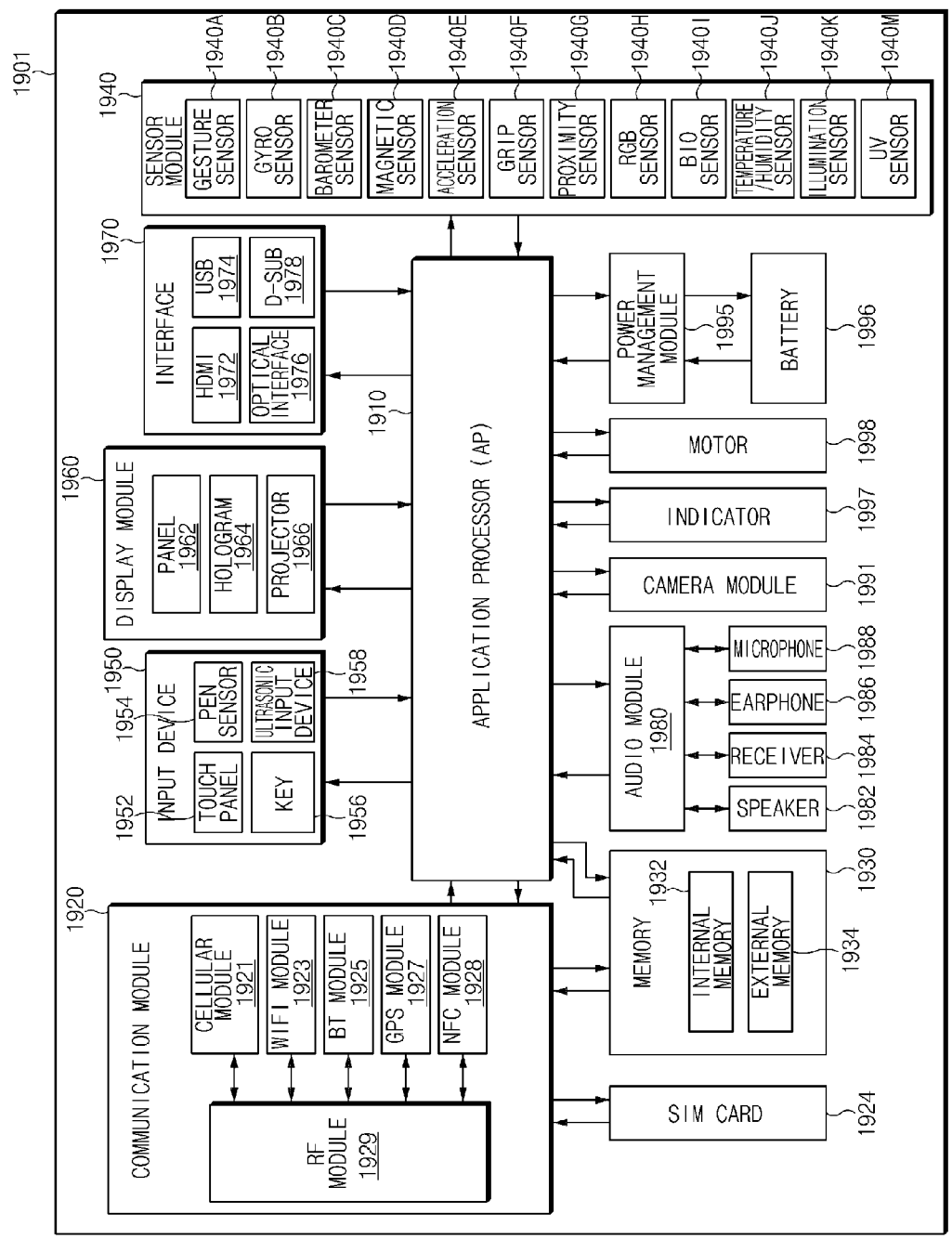
FIG. 19 is a block diagram of an electronic device according to various embodiments of the present disclosure.

FIG. 19 is a block diagram of an electronic device according to various embodiments of the present disclosure.

Referring to FIG. 19, the electronic device 1901 may be, for example, a whole or portion of the electronic device according to various embodiments of the present disclosure described so far. The electronic device 1901 may include one or more application processors (APs) 1910, a communication module 1920, a subscriber identification module (SIM) card 1924, a memory 1930, a sensor module 1940, an input device 1950, a display 1960, an interface 1970, an audio module 1980, a camera module 1991, a power management module 1995, a battery 1996, an indicator 1997, and a motor 1998.

The AP 1910 may execute an operating system or application programs to control a plurality of hardware or software components connected to the AP 1910 and may perform processing and calculation on various pieces of data including multimedia data. The AP 1910 may be implemented in a system on chip (SoC) for example. According to an embodiment, the AP 1910 may further include a graphic processing unit (GPU) (not shown).

The communication module 1920 may perform data transmission and reception in communication between other electronic devices connected to the electronic device 1901 through a network. According to an embodiment, the communication module 1920 may include a cellular module 1921, a wireless fidelity (WiFi) module 1923, a Bluetooth (BT) module 1925, a GPS module 1927, a near field communication (NFC) module 1928, and a radio frequency (RF) module 1929.

The cellular module 1921 may provide a voice call, a video call, a text message service, or an internet service through a communication network (such as an long term evolution (LTE), long term evolution-advanced (LTE-A), code division multiple access (CDMA), wideband code division multiple access (WCDMA), universal mobile telecommunications system (UMTS), wireless broadband (Wi-Bro) or global system for mobile communications (GSM) network). Also, the cellular module 1921 may use, for example, a SIM (such as a SIM card 1924) to perform the identification and authentication of an electronic device in a communication network. According to an embodiment, the cellular module 1921 may perform at least some of functions that the AP 1910 may provide. For example, the cellular module 1921 may perform at least some of multimedia control functions.

According to an embodiment, the cellular module 1921 may include a communication processor (CP). Also, the cellular module 1921 may be implemented in an SoC, for example.

According to an embodiment, the AP 1910 or the cellular module 1921 (such as a CP) may load, on volatile memories, commands or data received from at least one of a non-volatile memory connected to thereto or another component to process the commands or data. Also, the AP 1910 or the cellular module 1921 may store, on non-volatile memories, data received from at least one of other components or data generated by at least one of other components.

Each of the WiFi module 1923, the BT module 1925, the GPS module 1927 and the NFC module 1928 may include a processor for processing data transmitted and received through a corresponding module, for example.

According to an embodiment, at least some of (e.g., one or more) of the cellular module 1921, the WiFi module 1923, the BT module 1925, the GPS module 1927 and the NFC module 1928 may be included in an integrated chip (IC) or IC package. For example, at least some (such as a CP corresponding to the cellular module 1921 and a WiFi processor corresponding to the WiFi module 1923) of processors corresponding to the cellular module 1921, the WiFi module 1923, the BT module 1925, the GPS module 1927, and the NFC module 1928, respectively may be implemented in one SoC.

The RF module 1929 may perform data transmission and reception, such as transmission and reception of an RF signal. The RF module 1929 may include e.g., a transceiver, a power amp module (PAM), a frequency filter or a low noise amplifier (LNA) though not shown. Also, the RF module 1929 may further include a part such as a conductor or wire for transmitting and receiving electromagnetic waves in a free space when performing wireless communication.

According to an embodiment, at least one selected from the group consisting of the cellular module 1921, the WiFi module 1923, the BT module 1925, the GPS module 1927, and the NFC module 1928 may transmit and receive an RF signal through a separate RF module.

The SIM card 1924 may include a subscriber identity module and may be inserted into a slot that is formed on a specific location on an electronic device. The SIM card 1924 may include unique identification information (such as an integrated circuit card identifier (ICCID)) or subscriber information (such as an international mobile subscriber identity (IMSI)).

The memory 1930 may include an internal memory 1932 or an external memory 1934. The internal memory 1932 may include at least one of e.g., a volatile memory (such as a dynamic random access memory (DRAM), a static RAM (SRAM), or a synchronous dynamic RAM (SDRAM)) and a non-volatile memory (such as an one time programmable read-only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

According to an embodiment, the internal memory 1932 may be a solid state drive (SSD). The external memory 1934 may further include a flash drive, such as a compact flash (CF) drive, a secure digital (SD) drive, a micro secure digital (micro-SD) drive, a mini secure digital (mini-SD) drive, or an extreme digital (xD) drive, or a memory stick. The external memory 1934 may be functionally connected to the electronic device 1901 through various interfaces. According to an embodiment, the electronic device 1901 may further include a storage device (or storage medium) such as a hard disk drive (HDD).

The sensor module 1940 may measure a physical quantity or sense the operation state of the electronic device 1901 to convert measured or sensed information into an electrical signal. The sensor module 1940 may include at least one selected from the group consisting of a gesture sensor 1940A, a gyro sensor 1940B, an atmospheric pressure (barometer) sensor 1940C, a magnetic sensor 1940D, an acceleration sensor 1940E, a grip sensor 1940F, a proximity sensor 1940G, a color sensor 1940H (such as a red, green, blue (RGB) sensor), a bio sensor 1940I, a temperature/humidity sensor 1940J, an illumination sensor 1940K and a ultra violet (UV) sensor 1940M, for example. Additionally or alternatively, the sensor module 1940 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown) or a fingerprint sensor (not shown). The sensor module 1940 may further include a control circuit for controlling at least one sensor that is included in the sensor module 1940.

The input device 1950 may include a touch panel 1952, a (digital) pen sensor 1954, a key 1956 or an ultrasonic input device 1958. The touch panel 1952 may recognize a touch input by using at least one selected from the group consisting of a capacitive, pressure-sensitive, IR and ultrasonic techniques, for example. Also, the touch pane 1952 may also further include a control circuit. In the case of the capacitive technique, a physical contact or proximity awareness is possible. The touch panel 1952 may also further include a tactile layer. In this case, the touch panel 1952 may provide a user with a tactile response.

The (digital) pen sensor 1954 may be implemented by using the same or similar method as that of obtaining a user's touch input or by using a separate sheet for recognition, for example. The key 1956 may include a physical button, an optical key or a keypad, for example. The ultrasonic input device 1958 may sense a sound wave with a microphone (e.g., microphone 1988) at the electronic device 1901 to check data, through an input tool generating an ultrasonic signal, and the ultrasonic input device 1956 may thus perform wireless recognition. According to an embodiment, the electronic device 1901 may also use the communication module 1920 to receive a user input from an external device (such as a computer or server) connected thereto.

The display 1960 may include a panel 1962, a hologram device 1964 or a projector 1966. The panel 1962 may be a liquid-crystal display (LCD) or an active-matrix organic light-emitting diode (AM-OLED), for example. The panel 1962 may be implemented flexibly, transparently or wearably, for example. The panel 1962 and the touch panel 1952 may also be integrated into one module. The hologram device 1964 may use the interference of a light to show a stereoscopic image in the air. The projector 1966 may project a light onto a screen to display an image. The screen may be located internal or external to the electronic device 1901, for example. According to an embodiment, the display 1960 may further include a control circuit for controlling the panel 1962, the hologram device 1964 or the projector 1966.

The interface 1970 may include a high-definition multimedia interface (HDMI) 1972, a universal serial bus (USB) 1974, an optical interface 1976 or a D-subminiature (D-sub) 1978, for example. The interface 1970 may include a mobile high-definition link (MHL) interface, an SD card/multimedia card (MMC) interface or an infrared data association (IrDA) interface, for example.

The audio module 1980 may convert sound into an electrical signal or vice versa. The audio module 1980 may process sound information input or output through a speaker 1982, a receiver 1984, an earphone 1986 or the microphone 1988, for example.

The camera module 1991 may capture still pictures and video, and according to an embodiment, it is possible to include one or more image sensors (such as a front sensor or rear sensor), lens (not shown), an image signal processor (ISP, not shown), or a flash (not shown) (e.g., a light emitting diode (LED) or a xenon lamp).

The power management module 1995 may manage the power of the electronic device 1901. Although not shown, the power management module 1995 may include a power management integrated circuit (PMIC), a charger IC, or a battery or fuel gauge, for example.

The PMIC may be included in an IC or a SoC semiconductor, for example. Charging techniques may be classified into wired and wireless techniques. The charger IC may charge the battery and prevent overvoltage or overcurrent from a charger. According to an embodiment, the charger IC may include a charger IC for at least one selected from the group consisting of a wired charging technique and a wireless charging technique. The wireless charging technique includes, for example, a magnetic resonance type, a magnetic induction type, or an electromagnetic wave type, and an additional circuit for wireless charging may be added such as a coil loop, a resonance circuit, or a rectifier.

The battery gauge may measure the level, current or temperature of the battery 1996, or the voltage of the battery 1996 during charging, for example. The battery 1996 may store or generate electricity and use stored or generated electricity to supply power to the electronic device 1901. The battery 1996 may include a rechargeable battery or a solar battery, for example.

The indicator 1997 may show the specific states of the electronic device 1901 or a portion (e.g., AP 1910) of the electronic device 1901, such as a booting state, a message state or a charged state. The motor 1998 may convert an electrical signal into mechanical vibration. Although not shown, the electronic device 1901 may include a processing device (e.g., a GPU) for supporting a mobile TV. The processing device for supporting the mobile TV may process media data according to a standard such as digital multimedia broadcasting (DMB), digital video broadcasting (DVB) or media flow.

Each of the above-described elements of the electronic device according to the present disclosure may include one or more components and the names of corresponding elements may vary depending on the type of an electronic device. The electronic device according to the present disclosure may include at least one of the above-described elements and some elements may be left out or other elements may be further included. Also, some of the elements of the electronic device according to the present disclosure are combined to form an entity, which may equally perform the functions of corresponding elements before being combined.

The term "module" used in the present disclosure may mean a unit including one of hardware, software and firmware or a combination of two or more thereof, for example. The "module" may be interchangeably used with the term "unit", "logic", "logical block", "component", or "circuit", for example. The "module" may be an elementary unit of or a portion of an integral component. The "module" may also be an elementary unit for performing one or more functions or a portion of the elementary unit. The "module" may be implemented mechanically or electronically. For example, the "module" according to the present disclosure may include at least one selected from the group consisting of an application-specific integrated circuit (ASIC) chip, a field-programmable gate array (FPGA) and a programmable-logic device performing some operations that have been known or will be developed.

According to various embodiments, at least some of devices (such as modules or their functions) or methods (such as operations) according to the present disclosure may be implemented as commands stored in a non-transitory computer-readable storage medium in the form of a programming module, for example. When the command is executed by one or more processors, the one or more processors may execute a function corresponding to the command. At least a portion of the programming module may include e.g., a module, a program, a routine, a set of instructions or a process for executing one or more functions.

The non-transitory computer readable recording medium may include a magnetic medium such as a hard disk, a floppy disk and a magnetic tape, an optical medium such as a compact disk read only memory (CD-ROM) and a DVD, a magneto-optical medium such as a floptical disk, and a hardware device that is especially configured to store and execute a program command (such as a programming module), such as ROM, RAM, and a flash memory. Also, the program command may include a machine code made by a compiler and a high-level language code that may be executed by a computer by using an interpreter. The above-described hardware device may be configured to operate by one or more software modules to execute the operations of the present disclosure and vice versa.

The module or programming module according to the present disclosure may include at least one of the above-described elements, leave out some elements or further include other elements. Operations executed by a module according to the present disclosure, a programming module or another element may be executed by using a sequential, parallel, repetitive or heuristic method. Also, the orders in which some operations are performed may vary, some operations may be left out or further operations may be added.

The electronic device according to various embodiments of the present disclosure may have the through hole on the lateral face of the housing, a unique duct structure connecting the through hole to the electronic part, and the waterproof sheet covering the duct. Accordingly, it is possible to sufficiently support the performance of the electronic part itself installed in the electronic device and also maintain sufficient waterproof performance desired for the electronic device.

Also, since the electronic part of the electronic device according to various embodiments of the present disclosure faces the internal surface of the housing and the internal surface of the housing may sufficiently function as the barrier, there is no need for a separate barrier to be disposed on the front face of the electronic part. Accordingly, it is possible to implement a thin electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a housing having a base plate and a sidewall, the sidewall having a shape bent and extended from an end of the base plate;
   a duct in the base plate that is parallel to a surface of the base plate and having an external end open to the sidewall of the housing;
   an electronic part placed on an internal surface of the base plate to cover at least a portion of the duct; and
   a waterproof sheet disposed between the duct and the electronic part to protect the electronic part.

2. The electronic device according to claim 1, wherein the duct includes a section having a valley shape recessed from the internal surface of the base plate.

3. The electronic device according to claim 2, wherein the duct includes a slope decreasing toward the external end of the duct.

4. The electronic device according to claim 2, wherein a cross-sectional area of the external end of the duct is wider than remaining sections of the duct.

5. The electronic device according to claim 2, further comprising a dustproof sheet disposed between the duct and the waterproof sheet to protect the electronic part from a foreign material entering through the external end of the duct.

6. The electronic device according to claim 5, wherein the dustproof sheet covers the duct without a contact with a surface of the duct.

7. The electronic device according to claim 6, wherein the dustproof sheet covers an entire section of the duct.

8. The electronic device according to claim 6, wherein the waterproof sheet covers an entire region of the dustproof sheet.

9. The electronic device according to claim 1, wherein a placement guide for guiding the electronic part to a desired location for fastening is disposed near the duct on the internal surface of the housing.

10. The electronic device according to claim 9, wherein the placement guide has a barrier surrounding a lateral face of the electronic part, the barrier being open near the external end of the duct.

11. The electronic device according to claim 6, wherein a face on which the waterproof sheet is disposed is more recessed than a face on which the dustproof sheet is disposed, and the surface of the duct is more recessed than the face on which the dustproof sheet is disposed.

12. The electronic device according to claim 2, further comprising a filler disposed between the electronic part and the sidewall of the housing.

13. The electronic device according to claim 12, wherein at least a section near the duct on a connection between the base plate and the sidewall forms a first curved surface.

14. The electronic device according to claim 13, wherein a surface facing the first curved surface among surfaces of the filler is formed as a second curved surface having a shape corresponding to the first curved surface.

15. The electronic device according to claim 14,
wherein the waterproof sheet covers the first curved surface, and
wherein the second curved surface of the filler contacts the waterproof sheet.

16. The electronic device according to claim 15, further comprising a pressing member for pressing the filler toward the first curved surface.

17. The electronic device according to claim 16, wherein the pressing member is disposed on an opposite surface to a surface facing the base plate among opposite surfaces of the electronic part.

18. The electronic device according to claim 17, wherein the pressing member is a printed circuit board (PCB) installed in the electronic device.

19. The electronic device according to claim 1, wherein the housing has a communication hole branched from the duct and communicating with the surface of the base plate.

20. The electronic device according to claim 5, wherein an attachment region is provided on a perimeter of the waterproof sheet.

21. The electronic device according to claim 20, wherein the attachment region is formed on opposite surfaces of the waterproof sheet.

22. The electronic device according to claim 21, wherein a space is formed between a central portion of a lateral face of the base plate of the electronic part and the waterproof sheet.

23. The electronic device according to claim 1, further comprising a dustproof sheet disposed between the duct and the waterproof sheet to protect the electronic part from a foreign material entering through the external end of the duct.

24. The electronic device according to claim 23, wherein the electronic part has an input and output element for receiving data on at least one of temperature, humidity and wave from an outside or outputting the data to the outside, and
wherein the data enters the duct in the parallel direction to the surface of the base plate through the external end of the duct and then is bent away from the surface of the base plate to be input to the input and output element through the dustproof sheet and the waterproof sheet.

25. The electronic device according to claim 23, wherein the electronic part has an input and output element receiving data on at least one of temperature, humidity and wave from an outside or outputting the data to the outside, and
wherein the wave output from the input and output element enters the duct through the waterproof sheet and the dustproof sheet and is bent in the parallel direction to the surface of the base plate to be output to the outside through the external end of the duct.

26. An electronic device comprising:
a housing having a base plate and a sidewall, the sidewall having a shape bent and extended from an end of the base plate;
an electronic part having an input and output element for receiving data on at least one of temperature, humidity and wave from an outside or outputting the data to the outside, wherein the input and output element is disposed to face an internal surface of the base plate;
a duct in the housing having a shape recessed toward a surface of the base plate while facing the input and output element, and having an external end open toward a sidewall of the housing; and
a waterproof sheet disposed between the electronic part and the duct, covering a surface of the duct facing the input and output element.

* * * * *